May 8, 1956 L. M. CARVER 2,744,957
IMPROVED ELECTRONIC TRIGGER CIRCUIT
Filed Nov. 12, 1952 2 Sheets-Sheet 1
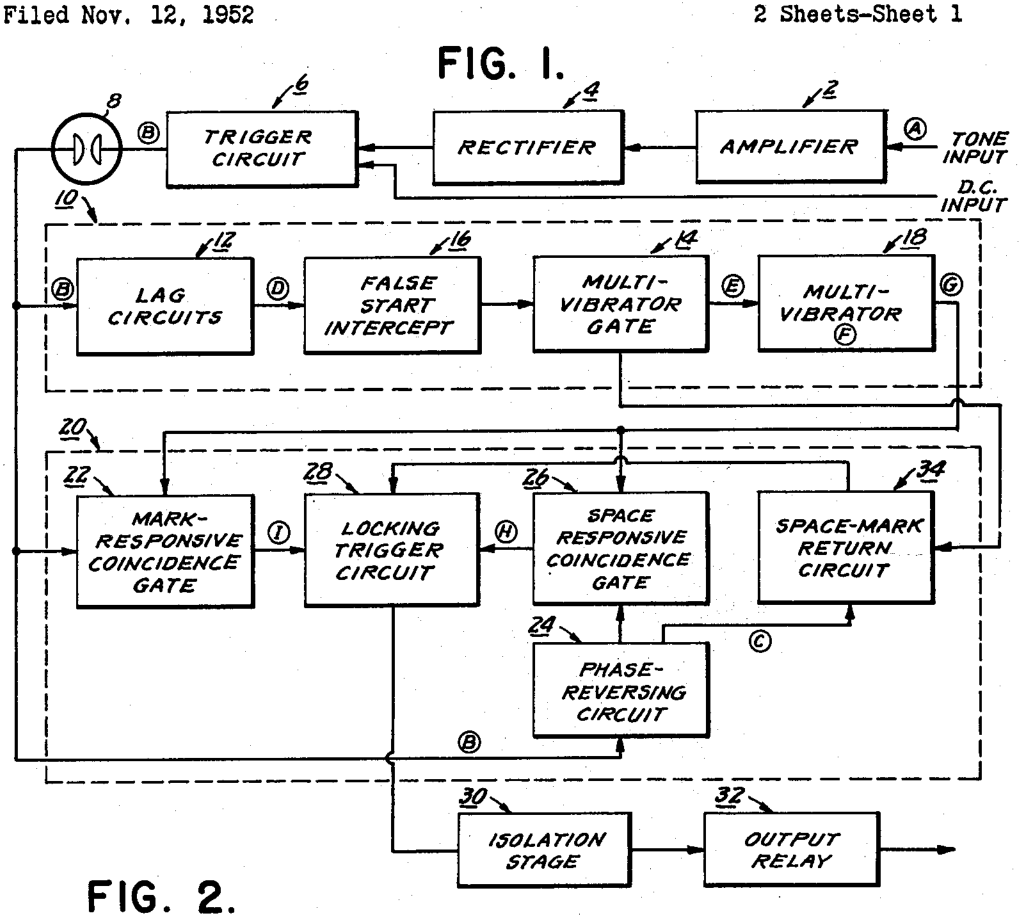
FIG. 1. FIG. 2.
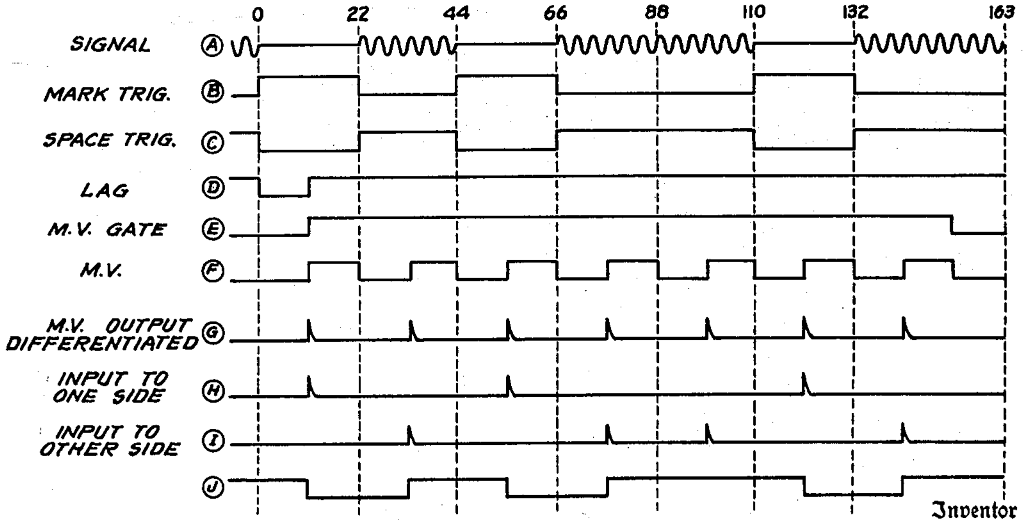
Inventor
LAWRENCE M. CARVER
By
Curtis, Morris & Safford.
Attorneys May 8, 1956 L. M. CARVER 2,744,957

IMPROVED ELECTRONIC TRIGGER CIRCUIT

Filed Nov. 12, 1952 2 Sheets-Sheet 2

Inventor

LAWRENCE M. CARVER

By

Curtis, Morris & Safford

Attorneys

United States Patent Office 2,744,957
Patented May 8, 1956

2,744,957

IMPROVED ELECTRONIC TRIGGER CIRCUIT

Lawrence M. Carver, Stamford, Conn., assignor to C. G. S. Laboratories, Inc., Stamford, Conn., a corporation of Connecticut Application November 12, 1952, Serial No. 320,080

11 Claims. (Cl. 178—70)

This invention relates to teletypewriter systems and in particular to an improved trigger circuit having special utility in teletypewriter systems but being also readily applicable to other uses.

With the increasing rates of signal transmission, it is becoming increasingly desirable to use electronic trigger circuits. However, the trigger circuits in use prior to the present invention did not always generate new pulses of the same duration as the incoming pulses if the pulses had slow rise and decay time. The new signal therefore was distorted in that the ratio of the duration of the mark pulses to the intervening spacing pulses was incorrect; this is referred to as "bias distortion."

In accordance with the present invention, an improved trigger circuit is provided that does not introduce significant bias distortion. Thus, in one aspect the invention provides an improved teletypewriting repeater system and in another aspect provides an improved electronic trigger circuit. In a preferred embodiment of the trigger circuit, a potential of one polarity is required to trigger the circuit to a first condition of operation and a potential of opposite polarity is required to trigger the circuit back to its initial operating condition; conventional electronic trigger circuits are triggered on and off by signals of like polarity.

Additional aspects, objects, and advantages of the invention will be in part pointed out in and in part apparent from the following description of a preferred embodiment of the invention considered in conjunction with the accompanying drawings, in which:

Figure 1 is a block diagram of a teletypewriter repeater;

Figure 2 shows the shapes of incoming pulses and of pulses generated at various places in the system;

Figure 1 is a block diagram showing the function of the principal components of an electronic teletypewriter repeater. This unit re-shapes the incoming pulses, samples them and regenerates new corresponding output pulses, the wave shapes of the signals at certain points in the circuit indicated by reference letters enclosed in a circle are shown on the corresponding portions of Figure 2.

Figure 3:
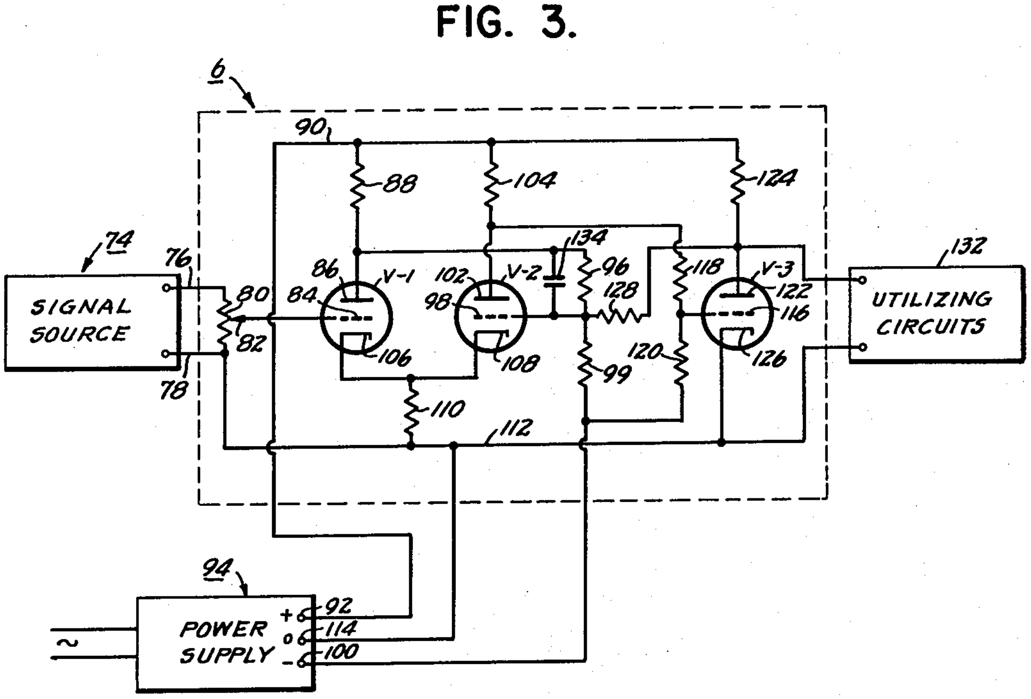
Figure 3 is a schematic diagram of a polar trigger circuit in accordance with the present invention.

If the incoming signal is in the form of a keyed tone signal, it is fed into an amplifier 2, rectified, as indicated at 4, and filtered to produce corresponding D. C. pulses; these D. C. pulses are applied to a trigger circuit 6.

The keyed D. C. pulses from the rectifier circuit ordinarily have sloping rise and decay times, for example, because of the filters in the teletypewriter transmission lines. The usual trigger circuit is arranged so that a vacuum tube is triggered suddenly to full conduction when the pulse voltage increases to a certain value; and then is triggered suddenly to a non-conducting condition when the pulse voltage decreases to a certain value. The improved trigger circuit provided by the present invention will be described in detail later.

The trigger circuit 6 thus generates new pulses having shorter rise and decay times. These new pulses are fed through a signal level indicator, in the form of a neon lamp 8, to the circuits for generating sampling pulses, indicated within the broken line 10. These circuits are energized at the start of each code group that is received and generate a series of six short pulses of such duration to coincide with the teletypewriter signals. These sampling pulses are compared one after the other with the incoming pulse signals in order to determine at each of these instants of time whether an incoming pulse signal is present.

The pulses are applied to the lag circuits 12 which introduce a time delay in the leading pulse of the code signal. The extent of this delay is manually adjustable for reasons that will be explained presently.

Between each code group there is a 31 millisecond stop pulse followed by a 22 millisecond start space at the beginning of each group. The transition from this long pulse to the following space provides a means by which the apparatus identifies the beginning of a code group.

In the lag circuit 12, a pulse is generated that controls the action of the multivibrator gate circuits. This lag control pulse starts at the initial mark-space transition of each code group. The trailing edge of this pulse is differentiated to produce the starting signal for the multivibrator gate 14 and thereby introduces a time delay equal to its length.

By adjusting the constants of the pulse generating network in the lag circuits 12, the extent of the delay can be varied. This pulse length is usually about 11 milliseconds for 60 W. P. M. circuits but can be varied over a substantial range. As will be explained later, this permits the incoming pulses to be sampled at their mid-points or at some other point so that signals can be satisfactorily decoded even in the presence of rather severe distortion of the mark-space ratio.

The signals from the lag circuit pass through a false-start interceptor 16 that includes apparatus for blocking the action of incoming initial pulses of less than a predetermined duration so as to minimize interference by noise or other extraneous signals. The differentiated signal produced by the trailing edge of the lag pulse triggers the multivibrator gate 14 which generates a pulse equal to the duration of the remainder of the code signal and also renders the lag circuits 12 inoperative so that they will not respond to any further pulses during the reception of this particular code group.

The multivibrator gate 14 permits the operation of the multivibrator 18 for 143 milliseconds during which time it generates 6½ cycles, each cycle having a duration of 22 milliseconds.

These multivibrator pulses are differentiated and the short pulse produced by the leading edge of each pulse (G in Figure 2) corresponds in time to the center of an incoming mark or space period, the exact relative timing depending upon the setting of the lag circuits 12.

The sampling of the regenerated incoming pulses takes place in sampling circuits enclosed within the broken line 20. The pulses from the trigger circuit 6 are applied to a mark-responsive coincidence gate 22; and also, through a phase-reversing stage 24 to a space-responsive coincidence gate 26. The differentiated pulses produced by the leading edges of the multivibrator pulses are also applied to both of these coincidence gates 22 and 26.

The coincidence gates 22 and 26 will operate to pass the short pulses from the multivibrator 18 only when the pulses applied from the trigger circuit 6 place a simultaneous voltage of predetermined polarity on the gate. Assume that these gates are arranged to pass the differentiated signals when a positive voltage is applied from the trigger circuit 6. Then if at the time a multivibrator pulse arrives at the coincidence gates, a mark pulse is being received, the gate 22 passes the short pulse, but the other coincidence gate 26 does not respond because the phase-reversing stage 24 causes the mark pulse to place a negative voltage on the gate 26. When a space is received, the corresponding multivibrator pulse is passed by the space coincidence gate 26 and rejected by the mark coincidence gate 22.

The pulses from these coincidence gates are applied to a locking trigger circuit 28 having two stable conditions of operation. When a mark-pulse is received from the gate 22, a first condition of operation is established which remains until a space-pulse is received from the gate 26; this pulse triggers the locking circuit 28 to a second condition of operation. The locking trigger circuit is arranged to produce corresponding mark and space voltages that are coupled through an isolation stage 30 to an output relay 32.

On the transition from mark to space, the sampling pulses from the multivibrator 14 are gated to the trigger locking circuit to hold the output on space until a subsequent mark pulse is received. However, if there is a steady state transition at the input from space to mark, the differentiated pulse from the trigger circuit 6 is negative and does not start the circuits for generating the sampling pulses; the output would therefore remain on space. To prevent this condition, a signal, which goes positive on a space to mark transition, is applied from the phase reversing stage 24 to space-mark return circuits 34. A second signal is taken also from the multivibrator gate circuits 14 and applied to the space-mark return circuits.

These signals control a gate circuit in the space-mark return circuits. The voltage supplied by the multivibrator gate 14 when it is not in cycle (that is, it has not been triggered by an incoming pulse) renders the space-mark return circuits responsive to the positive pulse from the phase-reversing circuit 24. The resulting pulse from the space-mark return circuits are applied to the locking trigger circuit and turns it to mark condition.

Figure 4A:
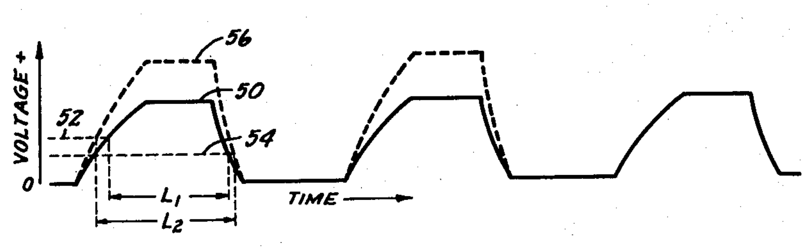
Figures 4*a* and 4*b* represent respectively polar and non-polar pulse signals for aid in explaining the principles of the present invention.
Figure 4B:
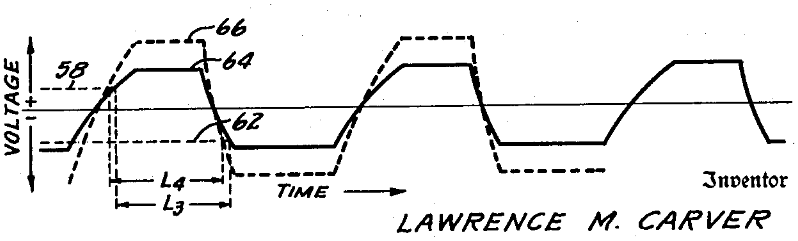

Figure 3 shows details of an improved trigger circuit 6 for use in the teletypewriter system of Figure 1 for polar input signals. In the more usual teletypewriter system, the polarity of the pulses applied to the trigger circuit 6 are of one polarity; that is, the applied voltage may rise from zero voltage to a given positive voltage, remain at this value for an instant and then return quickly to zero value, this process being repeated at short intervals. Pulses of this type are shown by Figure 4*a*. The trigger circuit 6 of Figure 3 is arranged to respond only to incoming pulses in which the polarity of the applied pulse signal reverses; that is, the applied voltage rises quickly to a positive value, remains at this value for an instant, and then returns quickly to zero value and continues changing until it reaches a negative voltage equal to the peak positive voltage. Pulses of this type are shown in Figure 4*b*.

One of the difficulties with the conventional trigger circuit arrangement is that the duration of the pulse generated by the trigger circuit changes with the amplitude of the incoming pulse signal. Consider the pulse 50 of Figure 4: as the applied voltage rises, it reaches a value indicated by the broken line 52 representing the voltage required to trigger one of the tubes to its "on" condition. This tube then remains "on" until the pulse voltage has reached its peak value and decreased to the voltage at which the tube is triggered to its "off" condition; this value is usually slightly less than the voltage required to trigger the tube "on" and is represented by the broken line 54. The new pulse generated by the trigger circuit has a duration equal to the time the tube is in its "on" condition, as indicated at $L_1$.

However, if the amplitude of the incoming pulse is increased, as indicated by the pulse 56, the pulse voltage rises more quickly to the "on" voltage indicated by line 52 and is later in decreasing to the "off" voltage indicated by the line 54. The pulse now generated by the trigger circuit has a duration indicated at $L_2$ which is longer than the pulse generated by the lower amplitude signal 50.

Automatic compression circuits have been used to decrease the variation in the amplitude of the incoming signals, but there remains substantial variation with the result that the width of the generated pulses does not remain constant, thus changing the mark-space ratio of the signal.

The present invention utilizes the trigger circuit 6 which is operated by polar pulses and in which the width of the generated pulses is substantially independent of the amplitude of the incoming pulses. The trigger circuit 6 requires a positive voltage, for example indicated by the broken line 58 in Figure 4b, to trigger it to its "on" condition. However, in order to trigger the circuit to its "off" condition, a negative voltage is required, for example as indicated by the broken line 62. The circuit will usually be adjusted so that the absolute amplitudes of the positive and negative voltages required to trigger the circuit are substantially equal. An incoming pulse 64 therefore will cause a square pulse having a duration equal to $L_3$ to be generated. Now, if the amplitude of the incoming pulses is increased as indicated by the pulse 66, the trigger circuit will be triggered "on" slightly earlier, but the negative voltage required to trigger it "off" will occur slightly earlier. The pulse 66, therefore, causes a pulse to be generated having a duration indicated at $L_4$ which is not significantly different from the duration $L_3$ of the pulse produced by the smaller incoming pulse 64.

In the circuit illustrated in Figure 3, polar pulses are presumed to be supplied from a source indicated in block form at 74 by two input leads 76 and 78. A potentiometer 80 connected across the leads 76 and 78 permits control of the amplitude of the incoming pulses by adjustment of the slider 82.

The potentiometer slider 82 is connected to the control element or grid 84 of an amplifying device, for example, as shown the amplifying device is a variable control unit or vacuum tube V–1, said slider and the lead to the first control element 84 provide first circuit means coupled to said first control element 84. The anode 86 of this tube is connected through a load impedance 88, shown as a resistor, to a positive voltage supply lead 90; this supply lead is connected to a positive output terminal 92 of a conventional power supply 94 containing the usual rectifier and filter circuits.

The anode 86 or current-collecting electrode of the tube V–1 is connected also through a resistor 96 to the control element or grid 98 of a second amplifying device V–2. As shown this second amplifying device is a variable control unit or second vacuum tube V–2.

The resistor 96 and a condenser 134 in parallel therewith act as second circuit means coupled to the second control element 98 of the second tube V–2 and act partially to control the voltage bias existing between the control element 98 and cathode 108 of the tube V–2. The control element or grid 98 is in turn connected through a resistor 99 to a negative terminal 100 of the power supply 94. The anode 102 or current-collecting electrode of the tube V–2 is connected through a load impedance 104, shown as a load resistor, to the positive voltage supply lead 90.

The cathodes 106 and 108 or electrodes acting as sources of current-carrying particles of these tubes V–1 and V–2, respectively, are connected together and through a common resistor or mutual bias control circuit means 110 to a neutral or common power supply lead 112 that is connected to an output terminal 114 of the power supply 94. The terminal 92 is positive with respect to the terminal 114, and the terminal 100 is negative with respect to the terminal 114. The incoming-pulse lead 78 is connected to the common lead 112.

In order to explain the operation of the trigger circuit, assume that the tube V–1 is drawing full plate current and that the plate current of the other tube V–2 is cut-off. The values of resistors 96 and 99 which form a voltage divider between the positive voltage at the anode 86 of the tube V–1 and the negative power supply terminal 100 are selected so that the grid 98 of the tube V–2 is negative with respect to the common lead 112. The plate current of the tube V–1 flowing through the common cathode resistor 110 produces still greater negative bias between the grid 98 and cathode 108 of the tube V–2. This negative bias prevents the flow of significant plate current in the tube V–2.

When the incoming pulse voltage changes so as to apply a negative voltage to the grid 84 of the tube V–1, the plate current in this tube decreases. This produces two effects: (1) The voltage at the anode 86 becomes increasingly positive because of the reduced voltage drop across the plate load resistor 88 applying increased positive voltage to the resistors 96 and 99 and causing the voltage at the grid 98 to change in a positive direction; and (2) the current through the common cathode resistor 110 decreases and so further reduces the negative bias between the grid 98 and cathode 108 of the tube V–2. The tube V–2 now draws plate current and the tube V–1 is biased to cut-off by the incoming negative pulse voltage and by the action of the cathode resistor 110.

In order to achieve the results set forth above, it is necessary to prevent the tube V–1 from conducting when the pulse voltage returns to zero. In this example, a separate bias-control circuit is provided to change the bias conditions of the tube V–2 at the time V–2 becomes conductive and which prevents V–1 from becoming conductive even if all negative pulse voltage is removed from its control grid 84.

This bias control circuit includes a third amplifying device, for example, as shown this third amplifying device is a vacuum tube V–3 having a control grid 116 connected to the junction of two series resistors 118 and 120 that form a voltage divider between the anode 102 of the tube V–2 and the negative supply terminal 100. The anode 122 of the tube V–3 is connected through a load impedance 124, shown as a resistor to the positive-voltage supply lead 90; its cathode 126 is connected directly to the common lead 112. The anode 122 of the tube V–3 is connected back through a resistor 128 to the control grid 98 of the tube V–2.

When the tube V–2 is cut-off, the tube V–3 is conducting because the voltage applied to the grid 116 is not sufficiently negative to prevent the flow of plate current in the tube V–3. The voltage at its anode 122 is therefore relatively low so that the voltage effect on the grid 98 of the tube V–2 through the resistor 128 does not cause current-flow in tube V–2.

However, when the tube V–2 becomes conducting and the tube V–1 is cut-off, the voltage at the anode 102 of the tube V–2 decreases, and the voltage at the grid 116 of the tube V–3 becomes increasingly negative and cuts off the flow of plate current in the tube. This, in turn, increases the positive voltage at the anode 122 of the tube V–3, and therefore through the resistors 128 and 99 increases the positive voltage on the grid 98 of the tube V–2. The resistors 128 and 99 are selected so that under these conditions, the tube V–2 will remain conductive and the tube V–1 will remain cut-off even if all pulse voltage is removed from the grid 84 of the tube V–1.

However, when the incoming pulse signal changes polarity so that the grid 84 is driven in a positive direction, the bias from the cathode resistor 110 is overcome and the tube V–1 starts to conduct current; this reduces the positive voltage at the anode 86 of tube V–1 and therefore reduces the positive voltage at the grid 98 of the tube V–2, so that the operating conditions of the tubes V–1 and V–2 are quickly reversed. When the tube V–2 ceases to conduct current, the tube V–3 becomes conductive because of the increased positive voltage applied to the control grid 116 by the resistors 118 and 120. A negative voltage will now be required at the grid 84 of the tube V–1 to trigger the circuit in the opposite direction.

The circuit can be arranged so that the tube V–2 initially draws current by selecting the values of the resistors 96 and 99 to make the grid 98 more positive. This biases off the tube V–1 through the action of the cathode resistor 110. A positive-input signal will now trigger the circuit.

The output pulses may be taken conveniently from either of tubes V–2 or V–3. In the illustrated arrangement, the utilizing circuits 132 are connected to the anode 122 of the tube V–3 and to the common lead 112.

In one particular embodiment of the invention, the tubes V–1 and V–2 were formed by the two sections of a 6SN7 tube, and the tube V–3 was one section of a 6SL7 tube. The terminal 92 of the power supply 94 was maintained at a positive potential of 150 volts with respect to the terminal 114, and the terminal 100 was maintained at a negative potential of 105 volts with respect to the common terminal 114.

The various components had the following values:

| Name | Reference Number | Value |
|---|---|---|
| Resistor | 88 | 220,000 ohms. |
| Do | 96 | 560,000 ohms. |
| Do | 104 | 100,000 ohms. |
| Do | 110 | 1,500 ohms. |
| Do | 99 | 820,000 ohms. |
| Do | 118 | |
| Do | 120 | |
| Do | 128 | 1.0 megohm. |
| Do | 124 | 100,000 ohms. |
| Capacitor | 134 | 270 mmf. |

From the foregoing, it will be apparent that the teletypewriter system embodying my invention is well adapted to attain the ends and objects hereinbefore set forth, and that it is subject to various modifications and adaptations in order to best adapt it for each particular use.

What is claimed is:

1. A trigger circuit comprising first and second electronic amplifying devices each capable of providing a controlled current in accordance with variations in electrical bias applied thereto, a mutual bias control circuit under the mutual control of said amplifying devices and arranged to prevent simultaneous flow of full current through both of said amplifying devices, and a separate bias control circuit under the control of said second amplifying device and arranged when said second amplifying device is conducting to shift the bias thereon in such direction as to tend to increase the current therethrough.

2. A trigger circuit having first and second stable conditions of operation comprising first and second electronic amplifying devices each capable of providing a controlled current in accordance with variations in electrical bias applied thereto, a mutual bias control circuit under the mutual control of said amplifying devices and arranged to prevent simultaneous flow of full current through both of said amplifying devices, means responsive to an applied voltage for stopping electrical conduction in one of said devices and starting conduction in the other of said devices, and a separate bias control circuit under the control of said second amplifying device and arranged when conduction is started in said second amplifying device to shift the bias thereon so as to change the magnitude of the applied voltage necessary to reverse the condition of operation.

3. In a trigger circuit having first and second stable conditions of operation, apparatus comprising a first vacuum tube having a control element, a second vacuum tube having a control element, a mutual bias control circuit under the mutual control of said first and second vacuum tubes and arranged to permit only one of said tubes to conduct full current at any one time, first circuit means coupled to said control element of said first tube for initiating conduction in said first tube, second circuit means coupled to said control element of said second tube for initiating conduction in said second tube, and separate bias control means responsive to conduction of current by said second tube and arranged to modify the operating bias of the second tube.

4. In a trigger circuit, a variable control unit having first and second stable conditions of operation and which is triggered from its first to its second condition at the beginning of an applied pulse and is triggered back into its first condition at the end of the pulse, apparatus for minimizing the effect of variations in amplitude of the control signal comprising a current-controlling unit having at least three electrodes, one of said electrodes being a source of current-carrying particles, another one of said electrodes being a control electrode co-acting with the other electrodes in the unit to control the flow of current through said unit, and a third electrode being a particle-collecting electrode, a load impedance element in series with said particle-collecting electrode, means connecting said control electrode to said variable control unit to be responsive to the triggering of said unit from its first to its second stable condition to alter the current flow through said load impedance to produce a voltage change thereacross, and second means connecting said load impedance to a second portion of said variable control unit to apply said voltage change to said second portion in such manner as to increase the tendency of said variable control unit to remain locked in said second condition, whereby the minimum difference in voltage which must occur before said variable control unit can be triggered from its second condition back into its first condition is increased substantially.

5. In a trigger circuit having first and second stable conditions of operation, apparatus comprising a first vacuum tube having a control element, a second vacuum tube having a control element, a mutual bias control circuit under the common control of said first and second vacuum tubes and arranged to permit only one of said tubes to conduct full current at any one time, first and second circuit means coupled to said control elements, respectively and arranged to initiate successive conduction in said first and separate second tubes, and bias control means responsive to conduction of current by said first tube and arranged to modify the operating bias of the second tube in such direction as to decrease any current flow therethrough.

6. In a trigger circuit having first and second stable conditions of operation, apparatus comprising a first vacuum tube having a control element, a second vacuum tube having a control element, a mutual bias circuit under the mutual control of said first and second vacuum tubes and arranged to permit only one of said tubes to conduct full current at any one time, first circuit means for initiating conduction in said first tube, second circuit means for initiating conduction in said second tube, and separate bias control means including a third vacuum tube having a control element connected to the anode-cathode circuit of said second tube and arranged to carry decreasing current as the current through said second tube increases, said control element of said second tube being coupled to the anode-cathode circuit of said third tube and being arranged to tend to further decrease the flow of current through said second tube as the current therethrough decreases.

7. In a trigger circuit having first and second stable conditions of operation, apparatus comprising a first vacuum tube having a control element, a second vacuum tube having a control element, first means under the control of said first tube for applying bias voltage to said second tube, second means under the control of said second tube for applying bias voltage to said first tube, first circuit means for initiating conduction in said first tube, second and separate bias control means responsive to conduction of current by said second tube and arranged to modify the operating bias of the second tube.

8. In a trigger circuit which is arranged to be responsive to the leading and trailing edges of pulses traveling along a transmission line and wherein the circuit is triggered from a first stable condition into a second stable condition when the voltage in the leading edge of each of said pulses reaches a first predetermined magnitude and wherein the circuit is triggered back into its first condition when the voltage in the trailing edges of each of said pulses reaches a second predetermined magnitude, a bias-distortion correction circuit for said trigger circuit arranged to establish a predeterminable minimum difference between said first and second predetermined magnitudes, said bias-correcting circuit including a unit having variable control characteristics, first circuit means connecting said unit to a first portion of said trigger circuit, said unit being responsive to the second stable condition thereof to change its control characteristics, and second circuit means connecting said unit to a second portion of said trigger circuit, said change in characteristics acting further to lock said trigger circuit in said second condition, whereby said predetermined minimum difference in voltage must occur before said trigger circuit can be triggered from its second back into its first condition.

9. For use with a trigger circuit which is arranged to be responsive to the leading and trailing edges of pulses traveling along a transmission line and wherein the circuit is triggered from a first stable condition into a second stable condition when the voltage in the leading edge of each of said pulses reaches a first predetermined magnitude and wherein the circuit is triggered back into its first condition when the voltage in the trailing edges of each of said pulses reaches a second predetermined magnitude, a bias-distortion correcting circuit for said trigger circuit arranged to establish a predeterminable minimum difference between said first and second predetermined magnitudes, a tube in said bias correcting circuit having at least a cathode, a control grid, and an anode, a load impedance connected in the anode circuit of said tube, first circuit means connecting a first portion of said trigger circuit to said control grid, whereby the conduction of current through said tube is changed by the triggering of said trigger circuit from said first condition into said second condition, thereby producing a voltage change across said load impedance, and second circuit means connecting said load impedance to a second portion of said trigger circuit to apply said voltage change to said second portion, thereby further locking said trigger circuit in said second condition, whereby the voltage in each of the trailing edges of said pulses must differ from said first predetermined magnitude by said predetermined minimum difference before said trigger circuit can be triggered from its second condition back into its first condition.

10. For use with a trigger circuit which is arranged to be responsive to the leading and trailing edges of pulses traveling along a transmission line, said trigger circuit including a first load impedance and a first current-controlling unit for controlling the current through said impedance and having at least three electrodes, one of said electrodes being a source of current-carrying particles, another one of said electrodes being a first control electrode co-acting with said other electrodes to control the flow of current through said unit, and a third electrode being a particle-collecting electrode, said trigger circuit being arranged to be triggered from a first stable condition in which the current flow through said first unit has a first value into a second stable condition in which the current flow through said first unit has a changed value, said triggering occurring when the voltage in the leading edge of each of said pulses reaches a first predetermined magnitude, and said trigger circuit arranged to be triggered back into its first condition when the voltage in the trailing edge of each of said pulses reaches a second predetermined magnitude, a bias-distortion correcting circuit for said trigger circuit arranged to establish a predeterminable minimum difference between said first and second predetermined magnitudes, said bias-correcting circuit including a second current-controlling unit having at least three electrodes, one of said electrodes being a second source of current-carrying particles, another one of said electrodes being a second control electrode for controlling the flow of current through said unit, and a third electrode being a second particle-collecting electrode, a second load impedance in circuit with said second particle-collecting electrode, first circuit means connecting said second control electrode to said first impedance so that the voltage of said second electrode is responsive to the value of current flow through said first load impedance, thereby to alter the current flow through said second load impedance as said trigger circuit changes from its first into its second condition, thereby to alter the current flow through said second load impedance as said trigger circuit changes from its first into its second condition, thus producing a voltage change across said second load impedance, and second circuit means connecting said second load impedance to said first control electrode, thereby further to change the flow of current through said first load impedance to lock said trigger circuit in said second condition, whereby the voltage in each of the trailing edges of said pulses must differ from said first predetermined magnitude by said predetermined minimum difference before said trigger circuit can be triggered from its second condition back into its first condition.

11. A trigger circuit arranged to respond to the leading and trailing edges of a pulse on a transmission line, said circuit comprising first, second and third current control units, each of said units having at least three electrodes, one of said electrodes in each unit being the principal source of current-carrying particles flowing through said unit, another one of said electrodes in each unit being the control element and co-acting with the other electrodes in the unit to control the flow of current carrying particles through said unit, and a third electrode in each unit being a particle-collecting electrode a direct voltage source for said units, a first load impedance connected between said direct voltage source and the particle-collecting electrode of said first unit, a second load impedance connected between said direct voltage source and the particle-collecting electrode of the second unit, a third load impedance connected between said direct voltage source and the particle-collecting electrode of said third unit, circuit means connecting the control electrode of said first unit to said transmission line so that as the voltage of a leading edge of a pulse on said line changes in a first direction to a pre-determined value said first unit commences to conduct substantial current, thus developing a first control voltage across said first load impedance, circuit means connecting the collecting electrode of said first unit to the control element of said second unit, so that said first control voltage drives the control element of said second unit into a voltage region to cut off the flow of current therethrough, thus developing a second control voltage across said second load impedance, second circuit means connecting the collecting electrode of said second unit to the control element of said third unit so that said second control voltage drives the control element of said third unit into a voltage region to increase the flow of current therethrough, thus developing a third control voltage across said third load impedance, and a third circuit means connecting the collecting electrode of said third unit to the control element of said second unit to drive said control element of said second unit further into the cut-off region, whereby when the trailing edge of a pulse on said transmission line is applied to the control electrode of the first unit, the voltage of the trailing edge of the pulse must change in a second direction a pre-determined minimum amount beyond said pre-determined value before the voltage across said first load impedance can restore the conduction of current through said second unit.

References Cited in the file of this patent

UNITED STATES PATENTS

| | | |
|---|---|---|
| 2,446,613 | Shapiro | Aug. 10, 1948 |
| 2,515,052 | Mitchell | July 11, 1950 |

FOREIGN PATENTS

| | | |
|---|---|---|
| 666,231 | Great Britain | Feb. 6, 1952 |